Patented June 17, 1930

1,764,601

UNITED STATES PATENT OFFICE

WEBSTER E. BYRON BAKER AND FRED G. ROBERTS, OF YORK HAVEN, PENNSYLVANIA, ASSIGNORS, BY MESNE ASSIGNMENTS, TO W. E. B. BAKER, OF BROOKLYN, NEW YORK

PRODUCT AND PROCESS OF MAKING THE SAME FROM SULPHITE WASTE LIQUORS

No Drawing.   Application filed May 26, 1923.   Serial No. 641,759.

The product of the present invention is derived from sulphite waste liquor, and sulphite waste liquor or sulphite cellulose extract consists of a mixture of organic compounds derived from the portions of wood which are rendered soluble during the process of cooking the chips under pressure in a digester by the sulphite process in order to convert them into pulp to be used for making paper. The product of the present invention is regenerated lignin in gelatinous form or in terms of colloidal chemistry "lignin gel". The product possesses the property of containing and holding large proportions of water. The product can be produced in large masses or in lumps of the required size. The product can be dehydrated by drying, and the dried product still possesses the property of absorbing water in large quantities and of swelling to practically the original volume. The product is insoluble in water. The product is a reversible colloid gel.

By the new process sulphur is split off from ligno-sulphonic acid compounds yielding lignin in the form of a reversible colloid gel, and the process, generally stated, includes treating waste sulphite liquor with chromic acid solution or with an oxidizing agent characterized by the absence of local action while the combined solution is basic in reaction.

One object of the invention is to provide lignin in gelatinous form, particularly in bulky continuous masses, which readily retain the form of the container in which they are prepared, and which possess the property of containing and holding large portions of water.

In practicing the process of the present invention it is advantageous to start with, as the source of lignin, sulphite cellulose extract treated and concentrated as described in an application of said Webster E. Byron Baker, Serial No. 539,284, up to and including the fourth step. That treatment and concentration may be described as follows:

The first step consists in collecting the waste liquors while still hot, filtering out fibers and solid materials in suspension, and pumping while still hot through a very fine spray nozzle or nozzles into the air under sufficient pressure to produce a mist. The second step consists in collecting the sprayed liquors and treating them at a temperature of substantially not less than 80 to 85° C. with the oxide or hydroxide of an alkaline earth metal in a tank provided with an agitator, until the loosely combined sulphur dioxide contained in the liquor is changed to the sulphite of the alkaline earth metal, and until the hydrogen ion concentration of the liquor is substantially such as is designated by the symbol or expression pH=9. The third step consists of filtering insoluble matter produced in the second step from the resulting liquor. The fourth step consists of the concentration of the resulting clear liquor to about 30° Baumé and to about 50% solids content without decomposition.

This 30° Baumé sulphite cellulose extract containing approximately 50% dry matter, is treated with an equal volume of chromic acid solution containing chromic acid (on the dry weight basis) in amount equal to approximately 15% of the weight of the dry matter in the sulphite cellulose extract. Although the chromic acid solution may be heated to accelerate the reaction it is not necessary to do so because in all cases where the solutions are at or above 35 or 40° C. the reaction is sufficiently rapid, the heat generated by the reaction being sufficient to accelerate the same reaction.

At the time of mixing the two solutions are stirred. The chromic acid is advantageously poured into the sulphite cellulose extract and during and after the addition of the chromic acid the solutions are stirred thoroughly until the gelatination action begins to take place, which usually happens in a short time, for example, in five to ten minutes.

If it is not essential that the gel formed be used in large masses, the stirring may be continued by which means it can be broken up into lumps of the required size.

Additional water may be added to the sulphite cellulose extract in amount even up to another volume or more and a gel is still formed, although the velocity of the gel forming reaction is slower.

The gel so formed can be dehydrated by drying, preferably at low temperature, and after all the water has been lost the dried product still possesses the property of absorbing water in very large quantities and swelling to practically the original volume.

The lignin gel in either case may be purified by stirring up the particles continually with clean water and continuously decanting the water. Further purification may be effected by washing the gel particles with hydrochloric acid after the water has extracted all the water soluble material. The purified gel is insoluble in water but possesses the ability to absorb water rapidly and in relatively larger proportions. Gels have been made in this manner which held as much as 97.4% water with apparent ability to swell and absorb more water.

The reaction governing the initial gel formation may be said to consist of the oxidation of all the sulphur in the ligno-sulphonic acid salt compounds present into sulphuric acid, which with the lime present forms calcium sulphate (or equivalent alkaline earth sulphate) and also chromium sulphate. The calcium and the chromium sulphates are washed out with water as above described. Inasmuch as more than the chromium equivalent of sulphur must be used and inasmuch as further amounts of chromium can be extracted from the gel by subsequent washing with hydrochloric acid, it is evident that a secondary reaction also takes place resulting in the formation of insoluble (hydrated) chromic oxide ($Cr_2O_3$) in the jelly-like mass. This while insoluble in water is soluble in hydrochloric acid. Such other acids as form soluble chromic salts and do not affect the gel may also be used for washing out the last portions of chromium.

In some cases it may be desirable or more economical to generate the chromic acid in solution in the sulphite cellulose extract, and this can be accomplished by adding an equivalent solution of sodium or potassium dichromate to the sulphite cellulose extract and after thorough mixing adding an amount of sulphuric acid equivalent to the dichromate used. Care should be exercised to avoid an excess of sulphuric acid, as such excess interferes with the proper formation of the gel. The sulphuric acid may also be added to the dichromate solution before adding the same to the sulphite cellulose extract.

Other oxidizing agents suggest themselves for carrying out this reaction but the requirements of an oxidizing agent for the production of the best results are the absence of local action particularly while the combined or mixed solution is basic in reaction, thus eliminating the formation of heterogeneous flocculent masses in the mixture, and the functioning without the evolution of such amounts of gaseous products as would, due to the escape of many gaseous bubbles, destroy the proper action and formation of the gel.

The product "lignin gel" is new because previous to this invention lignin has not been formed or regenerated in this valuable form. All other processes known to me of splitting off the sulphur from the ligno sulphonic acid compounds and evolving same as sulphur dioxide yield a lignin which is pulverulent and devoid of the properties of making a reversible colloid gel. The technical applications of lignin gel are broad and numerous, for example, wherever the retention of water is important, and relatively slow syneretic action, the lignin gel can be employed to advantage. Possibly specific applications in this case might include use in agriculture for the longer retention of moisture and rainfall in the soil. Lignin gel may be used in industries where the above property is advantageous, for example, in the treatment of some kinds of textiles and paper.

Lignin gel can be made from untreated sulphite cellulose extract but not with the same degree of satisfaction as from sulphite extract treated according to the four steps recited in this description. By untreated sulphite cellulose extract is meant sulphite cellulose waste liquor. The gel formation does not take place so satisfactorily probably because the untreated liquor has a much greater acid reaction. Gels prepared from them are useful although not such perfect products. The greater dilution of untreated liquors is detrimental to the formation of gels in the best form and in short periods of time, and the amount of chromic acid which must be used in converting the untreated liquors into gels is greater on the basis of the dry matter contents of the liquors.

It will be obvious to those skilled in the art that modifications may be made in details of procedure and that chemical equivalents may be substituted without departing from the spirit of the invention which is not limited as to such matters or otherwise than as the prior art and the appended claims may require.

We claim:

1. As an article of manufacture lignin in the form of a reversible colloid gel devoid of ligno-sulfonic acid.

2. The process of making lignin gel from sulphite cellulose extract which consists in subjecting the same to the action of chromic acid solution, and washing the gel with water.

3. The process of making lignin gel from sulphite cellulose extract which consists in subjecting the same to the action of chromic acid solution, and washing the gel with water and acid.

4. The process of making lignin gel from sulphite cellulose extract which consists in oxidizing all the sulphur in the ligno-sulphonic acid salt compounds present into sulphuric acid, forming sulphates, and washing out the sulphates.

5. The process of making lignin gel from sulphite cellulose extract which consists in treating the same with chromic acid solution to oxidize all the sulphur in the ligno-sulphonic acid salt compounds present into sulphuric acid, forming sulphates and insoluble hydrated chromic oxide, and washing out the sulphates and oxide with water and acid in which the oxide is soluble.

WEBSTER E. BYRON BAKER.
FRED G. ROBERTS.